UNITED STATES PATENT OFFICE.

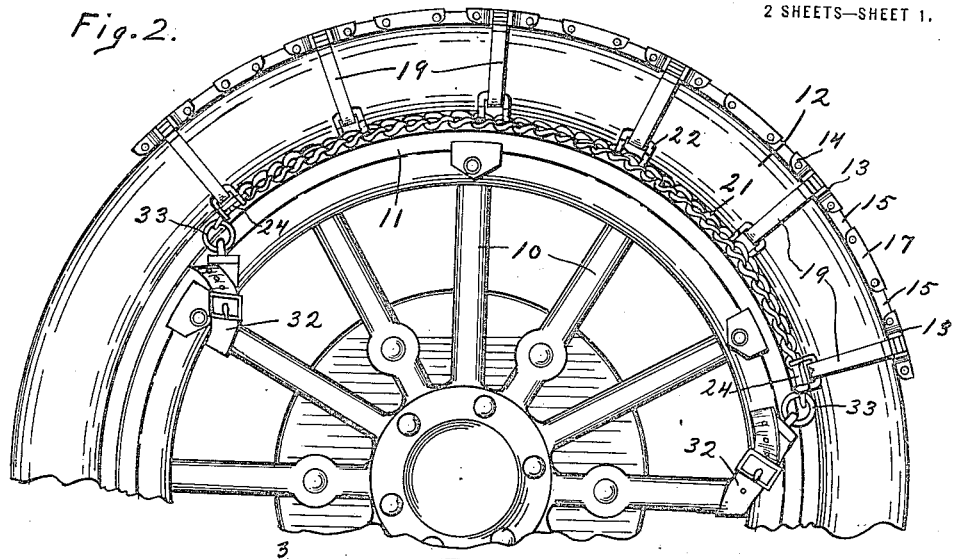
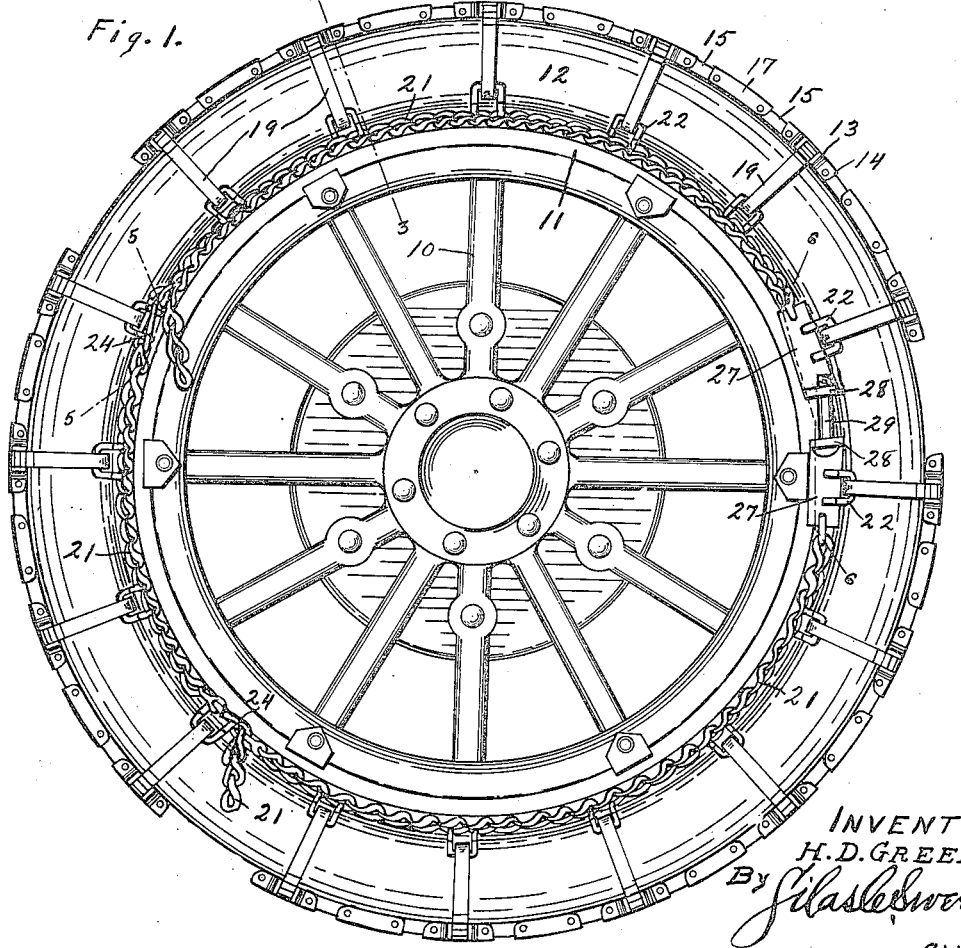

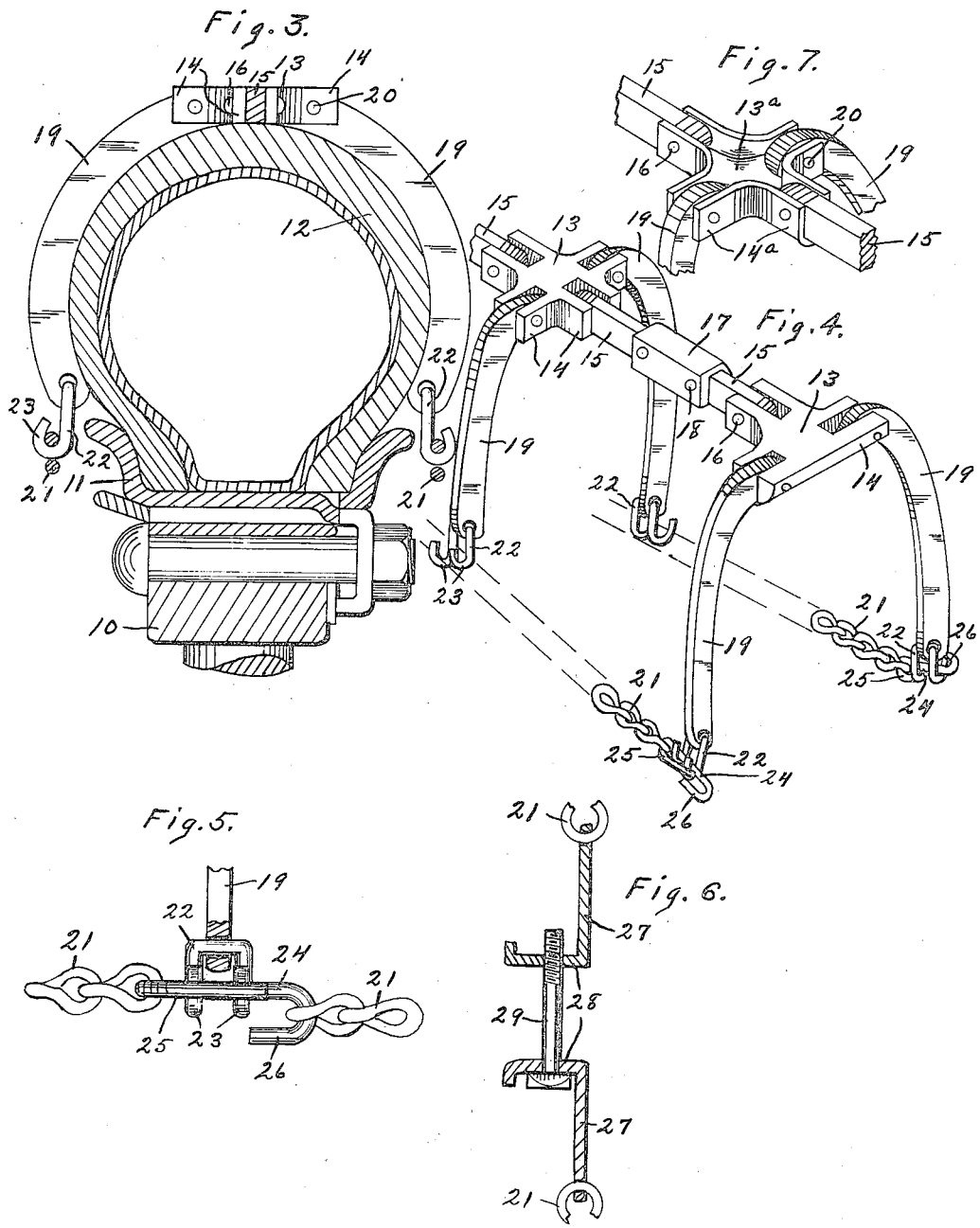

HAROLD D. GREENE, OF BRITT, IOWA.

ANTISKID TIRE-GRIP.

1,271,699.  Specification of Letters Patent.  Patented July 9, 1918.

Application filed July 16, 1917.  Serial No. 180,728.

*To all whom it may concern:*

Be it known that I, HAROLD D. GREENE, a citizen of the United States of America, and resident of Britt, Hancock county, Iowa, have invented a new and useful Antiskid Tire-Grip, of which the following is a specification.

The object of this invention is to provide improved tire grip devices adapted for use on tires of motor vehicles for the purpose of preventing skidding of the vehicle wheels and also to increase the tractive power thereof.

A further object of this invention is to provide improved means for mounting the tire grip devices on a tire.

A further object of this invention is to provide a maximum of flexibility in such a device, in order to reduce wear on the tire and also prevent interference with the resilience thereof.

A further object of this invention is to provide improved means for mounting a single section of the grip devices on a wheel tire in the event of an emergency such as the necessity of pulling the vehicle out of a mud hole.

This invention relates to and is an improvement on devices disclosed and claimed in my Patent No. 1,241,621, granted October 2, 1917, to which patent reference hereby is made.

My invention consists in the construction, arrangement and combination of elements hereinafter set forth, pointed out in my claims and illustrated by the accompanying drawings, in which—

Figure 1 is a side elevation of a vehicle wheel having its tire equipped with a full set of my improved devices. Fig. 2 is a side elevation of a portion of a wheel having its tire equipped with a single section of the devices for certain purposes. Fig. 3 is an enlarged cross-section on the line 3—3 of Fig. 1, the rim and tire parts being shown conventionally; Fig. 4 is a perspective showing a portion of the grip devices detached and extended, for convenience, in a straight line. Fig. 5 is a detail, partly in section, approximately on the line 5—5 of Fig. 1. Fig. 6 is a detail section on the line 6—6 of Fig. 1, on an enlarged scale.

Fig. 7 is a detail perspective illustrating a modified form of the tread block.

In the construction and mounting of the device as shown, the numeral 10 designates generally an automobile wheel having a demountable rim 11 of any suitable construction carrying a pneumatic tire 12.

My improved tire grip preferably is made up of a plurality of circumferentially separable tread sections, two or more in number, independently securable to the wheel but adapted to be connected in an endless series when desired. As shown there are three such sections, and Fig. 1 illustrates all of such sections connected to form a complete tire-gripping and anti-skidding device. One of the principal characteristics of each section is a flexible tread bar located centrally of the tread surface of the tire 12 and extended circumferentially thereof, and each tread bar is made up of tread blocks 13 and connecting links. The tread blocks 13 are formed with laterally and longitudinally projecting bifurcated lugs 14, and as shown particularly in Fig. 4 said blocks are formed in one piece as by molding or casting. The connecting links between successive tread blocks 13 are, in my present construction, formed each of three members, namely end sections 15 pivotally secured at one end each to a bifurcated lug 14 by a pin 16; and a central section 17 between said end sections and pivotally connected thereto as by pins 18. The central section 17 preferably is U-shaped or channel-shaped in cross-section and embraces at its ends end portions of the end sections 15. In this manner the connections between successive tread blocks are made very flexible by division into small pivoted sections. The channeled central sections 17, which here have their closed surfaces arranged outwardly, provide good wearing surfaces and also increase somewhat the traction, but said sections may be reversed if desired.

Curved grip bars 19 are provided and conform in a general way to the curvature transversely of the tire 12. Each curved grip bar 19 is pivotally connected at one end by a pin 20 to a laterally extending bifurcated lug 14 of one of the tread blocks, and extends partially around the tire toward the rim 11. The free or radially inner ends of the curved grip bars 19, at each side of the tire, are secured together by flexible connections, preferably in the form of chains 21. The chains 21 preferably are not directly connected to the free ends of the curved grip bars 19, but flexible pivoted connections are provided therefor in the form of U-shaped links 22 having their closed portions pivoted in free ends of said grip bars, and having their arms formed with outturned hooks 23 engaging links of said chains. This permits independent movement of the grip bars 19 without shifting the chains 21 inwardly and outwardly on the wheel rim, but permits such movement of the grip bars by pivotal movement between them and the links 22 under stress of load and consequent flattening of the tire. This gives greater flexibility to the tire tread and also has a tendency to reduce wear on the tire.

Suitable means is provided for adjustably connecting adjacent end portions of successive sections of the device. To this end the connecting chains 21 may be provided at their ends with double-hooked links 24; one end hook 25 of each of said links being closed and engaging permanently an end of a chain 21, as shown particularly in Figs. 4 and 5, and also being extended to embrace the hooked end portions 23 of a U link 22; the other end hook 26 of each of said links 24 being of open form and adapted to receive detachable connection of a link of a chain 21 adjacent to the chain permanently carrying said connecting link, whereby grip sections may be adjustably connected. I also find it desirable to provide other adjustable connecting means between certain adjacent sections, to take up all slack in the chains, such means being shown particularly in Fig. 6. In this construction plates 27 are pivotally connected at one end each to an end of a chain 21, and are formed at their opposite or adjacent ends with outturned flanges 28 apertured to receive a bolt 29. One of the plates 27 preferably has its aperture threaded to receive the threaded end of the bolt 29, whereby said bolt may form an adjustable connection between said plates. In this manner considerable tension may be placed on the chains 21, so that there is no possibility of the tread devices creeping circumferentially of the tire.

When the grip devices are mounted in arcs as shown in Figs. 1 and 2 the sections 15 are inclined slightly, articulating toward the center of the wheel on the pins 18, thus flexing their connections with the central sections 17. In use thereafter the sections 15 may oscillate freely, being limited in one direction only, to alinement with the sections 17.

In the construction according to Fig. 7 I have shown the tread block 13ª with its bifurcated lugs 14ª formed of sheet steel in one piece by stamping or pressing.

In Fig. 2 is shown a portion of a wheel and tire to which a single section of my tread and grip devices are applied. This is desirable at times when the wheel is in such position as to prevent the application of an entire set of the devices, as when the vehicle becomes lodged in a mud hole and recourse must be had to tread devices to increase the traction of the wheels in extricating the vehicle. For this purpose the section may be anchored at its ends by flexible straps 32, as of leather, formed with rings 33 at their ends adapted to be attached to the links 24 or other portions of the chains 21, and passed around the felly of the wheel from one side chain 21 to another around or beyond a spoke in such manner as to apply longitudinal strain to said side chains and hold the device in place. This application is not intended for general use but only for emergencies.

I claim as my invention—

1. Spaced side chains formed in sections, devices adapted to connect respective sections of each chain detachably, one of said devices being formed of a single length of metal having terminal open hooks lying in planes at right angles to each other and adapted loosely to engage spaced chain links, all of said connecting devices being formed with bearings between their ends, U-shaped links engaging said bearings at their ends, and anti-skid members connecting laterally-opposed U-shaped links and adapted to extend across the tread of a tire.

2. Spaced side chains formed in sections, devices adapted to connect respective sections of each chain detachably, one of said devices in each chain being formed of a single length of metal having terminal open hooks lying in planes at right angles to each other adapted to engage pivotally adjacent end links of spaced chain sections, said device being of greater length than any link of either chain, together with U-shaped links disposed at right angles to each connecting device and formed with terminal open hooks adapted to engage and pivot on the body of the connecting device, and anti-skid members pivoted to the central portions of laterally-opposed U-shaped links and adapted to extend across the tread of a tire.

3. An anti-skid tire grip, comprising circumferentially spaced tread blocks, curved and laterally extended grip bars pivoted to said tread blocks, triple-member tread bars alternating with and pivoted at extreme ends to said tread blocks and in line with central portions of the blocks, and flexible means connecting the free ends of the grip bars.

4. An anti-skid tire grip, comprising circumferentially spaced tread blocks, tread bars, each including at least three members pivoted together in sequence, connecting said tread blocks and including centrally located channeled sections, curved transverse grip bars pivotally connected to said tread blocks, and flexible connections between the inner ends of said grip bars.

5. An anti-skid tire grip, comprising circumferentially spaced tread blocks formed with laterally and longitudinally projecting bifurcated lugs, multi-section tread bars connecting said tread blocks through pivotal connections to the longitudinally extending lugs, said tread bars including channeled intermediate sections embracing the end sections, curved, laterally extending grip bars pivoted to the laterally extended lugs of said tread blocks, and flexible connections between free ends of said grip bars.

6. In an anti-skid tire grip, tread blocks adapted to be mounted on the tread of a tire and each comprising a body having a plane surface adapted to contact with said tire and having integral, bifurcated, apertured lugs extending in both directions laterally from said tread block and adapted to receive pivotal connections to connecting devices for securing said tread block to a tire, and also having other integral, bifurcated, apertured lugs extending at right angles to the first lugs, and three-member tread bars alternating with said blocks and pivoted at extreme ends to the latter lugs.

7. An anti-skid tire grip, comprising circumferentially spaced tread blocks, tread bars connecting said tread blocks and each including three members pivoted together in sequence and pivoted at extreme ends to adjacent tread blocks, the central member of each tread bar being channeled, curved transverse grip bars pivotally connected to said tread blocks, and flexible connections between the free ends of said grip bars.

HAROLD D. GREENE.